US008364462B2

(12) United States Patent
Joy et al.

(10) Patent No.: US 8,364,462 B2
(45) Date of Patent: Jan. 29, 2013

(54) CROSS LINGUAL LOCATION SEARCH

(75) Inventors: Joseph M. Joy, Bangalore (IN); Tanuja Abhay Joshi, Pashan Pune (IN); Udayan Khurana, New Delhi (IN); Arumugam Kumaran, Bangalore (IN); Vibhuti Singh Sengar, Unnao (IN); Tobias W. M. Kellner, Bischofswiesen (DE)

(73) Assignee: Microsoft Corporation, Redmond, WA (US)

(*) Notice: Subject to any disclaimer, the term of this patent is extended or adjusted under 35 U.S.C. 154(b) by 1057 days.

(21) Appl. No.: 12/145,615

(22) Filed: Jun. 25, 2008

(65) Prior Publication Data

US 2009/0326914 A1   Dec. 31, 2009

(51) Int. Cl.
*G06F 7/00* (2006.01)
*G06F 17/30* (2006.01)
*G06F 17/27* (2006.01)
*G06F 17/28* (2006.01)

(52) U.S. Cl. ................. 704/2; 704/9; 707/706

(58) Field of Classification Search .......... 704/2, 9; 707/706
See application file for complete search history.

(56) References Cited

U.S. PATENT DOCUMENTS

| | | | |
|---|---|---|---|
| 1,261,167 A | 4/1918 | Russell | |
| 5,710,916 A | 1/1998 | Barbara et al. | |
| 5,758,314 A * | 5/1998 | McKenna | 704/8 |
| 5,781,906 A | 7/1998 | Aggarwal et al. | |
| 5,802,361 A | 9/1998 | Wang et al. | |
| 5,875,446 A | 2/1999 | Brown et al. | |
| 6,101,496 A | 8/2000 | Esposito | |
| 6,167,369 A * | 12/2000 | Schulze | 704/9 |
| 6,321,189 B1 | 11/2001 | Masuichi et al. | |
| 6,349,276 B1 * | 2/2002 | McCarley | 704/8 |
| 6,381,598 B1 | 4/2002 | Williamowski et al. | |
| 6,629,097 B1 | 9/2003 | Keith | |
| 6,732,120 B1 * | 5/2004 | Du | 715/764 |
| 6,868,410 B2 | 3/2005 | Fortin et al. | |
| 6,904,560 B1 | 6/2005 | Panda et al. | |
| 7,007,013 B2 | 2/2006 | Davis et al. | |
| 7,117,199 B2 | 10/2006 | Frank et al. | |
| 7,146,358 B1 | 12/2006 | Gravano et al. | |
| 7,158,878 B2 | 1/2007 | Rasmussen et al. | |
| 7,174,290 B2 * | 2/2007 | Loofbourrow et al. | 704/9 |
| 7,246,109 B1 | 7/2007 | Ramaswamy | |
| 7,257,570 B2 | 8/2007 | Fiise et al. | |

(Continued)

FOREIGN PATENT DOCUMENTS

| | | |
|---|---|---|
| WO | WO 2005/096178 | 10/2005 |
| WO | 2007133625 A2 | 11/2007 |

OTHER PUBLICATIONS

Aslan, et al., "COMPASS2008: Multimodal, Multilingual and Crosslingual Interaction for Mobile Tourist Guide Applications", Lecture Notes in Computer Science, 2005(3814), Date: 2005, pp. 3-12, Publisher: Springer Berlin / Heidelberg.

(Continued)

*Primary Examiner* — Eric Yen (57) ABSTRACT

A cross-lingual location search uses a combination of translation and transliteration of query tokens to develop a set of candidate matches for further searching. A query is broken up into individual tokens (e.g. address parts) and a list of transliterations and/or translations for each token is developed. The translated and transliterated results are keyed against a spatial database using both literal database keys and transliterated database keys. Matches from the resulting searches are selected when a spatial overlap, or constraint, occurs among subsequences of the query tokens.

20 Claims, 3 Drawing Sheets

U.S. PATENT DOCUMENTS

| | | | |
|---|---|---|---|
| 7,293,028 | B2 | 11/2007 | Cha et al. |
| 7,471,839 | B2 | 12/2008 | Moreira |
| 7,634,496 | B1 | 12/2009 | Evans |
| 7,668,817 | B2 | 2/2010 | Enomoto et al. |
| 7,917,480 | B2* | 3/2011 | Dean et al. ............ 707/693 |
| 2002/0193986 | A1* | 12/2002 | Schirris ................. 704/8 |
| 2003/0033328 | A1 | 2/2003 | Cha et al. |
| 2004/0024756 | A1 | 2/2004 | Rickard |
| 2005/0065916 | A1 | 3/2005 | Ge et al. |
| 2005/0108213 | A1 | 5/2005 | Riise |
| 2005/0119875 | A1* | 6/2005 | Shaefer et al. ............ 704/7 |
| 2005/0216253 | A1* | 9/2005 | Brockett ................. 704/5 |
| 2006/0089927 | A1 | 4/2006 | Bandyopadhyay et al. |
| 2006/0089928 | A1 | 4/2006 | Johnson |
| 2006/0197763 | A1 | 9/2006 | Harrison et al. |
| 2006/0218114 | A1 | 9/2006 | Weare et al. |
| 2006/0242129 | A1 | 10/2006 | Libes |
| 2007/0043723 | A1 | 2/2007 | Bitan et al. |
| 2007/0088690 | A1 | 4/2007 | Wiggen et al. |
| 2007/0094006 | A1 | 4/2007 | Todhunter et al. |
| 2007/0143318 | A1 | 6/2007 | Hendrey et al. |
| 2007/0150199 | A1 | 6/2007 | Riise et al. |
| 2007/0198505 | A1 | 8/2007 | Fuller |
| 2007/0233649 | A1 | 10/2007 | Wang et al. |
| 2007/0276845 | A1 | 11/2007 | Geilich |
| 2008/0010259 | A1 | 1/2008 | Feng et al. |
| 2008/0065670 | A1 | 3/2008 | Cha et al. |
| 2008/0270111 | A1* | 10/2008 | Hanumanthappa ............ 704/3 |
| 2008/0319990 | A1 | 12/2008 | Taranenko et al. |
| 2009/0037403 | A1 | 2/2009 | Joy et al. |
| 2009/0324132 | A1 | 12/2009 | Joy et al. |

OTHER PUBLICATIONS

Viola, et al. "Learning to Extract Information from Semi-structured Text using a Discriminative Context Free Grammar", Proceedings of the 28th annual international ACM SIGIR conference on Research and development in information retrieval, Date: 2005, pp. 330-337, Publisher: ACM New York, NY, USA.

Xu, et al., "A System for Uniform and Multilingual Access to Structured Database and Web Information in a Tourism Domain", In Proceedings of ACL 2000 Demo Session, Date: 2000, 2 Pages.

Onaizan, et al., "Machine Transliteration of Names in Arabic Text", Proceedings of the ACL-02 workshop on Computational approaches to semitic languages, Year of Publication: 2002 pp. 1-14, Publisher: Association for Computational Linguistics Morristown, NJ, USA.

Chaudhuri, et al., "Robust and Efficient Fuzzy Match for Online Data Cleaning", Proceedings of the 2003 ACM SIGMOD international conference on Management of data, Date: Jun. 9-12, 2003, pp. 313-324, Publisher: ACM New York, NY, USA.

Christen, et al., "A Probabilistic Geocoding System based on a National Address File", Proceedings of the 3rd Australasian Data Mining Conference, Cairns, Dec. 2004, 13 Pages.

"CLEF Forum", 1 Page, http://www.clef-campaign.org.

Gargantini Irene, "An Effective Way to Represent Quadtrees", Date: Dec. 1982, pp. 905-910, vol. 25, Issue: 12, Publisher: ACM New York, NY, USA.

"GeoCLEF", 2 Pages, http://ir.shef.ac.uk/geoclef.

Goldberg, et al., "From Text to Geographic Coordindates: The Current State of Geocoding", URISA Journal, Date: 2007, pp. 33-46, vol. 19, Issue: 1.

Kristjansson, et al., "Interactive Information Extraction with Constrained Conditional Random Fields", In Proceedings of AAAI'2004, pp. 412-418.

Knight, et al., "Machine Transliteration", Date: 1997, 8 Pages.

"MaxEnt Classifier", Copyright 2003, Dekang Lin, 21 Pages.

Oh, et al., "A Comparison of Different Machine Transliteration Models", Journal of Artificial Intelligence Research 27, Date: Oct. 2006, pp. 119-150.

Pouliquen, et al. "Geographical Information Recognition and Visualization in Texts Written in Various Languages", Symposium on Applied Computing, Proceedings of the 2004 ACM symposium on Applied computing, Publication Date: 2004, pp. 1051-1058, Publisher: ACM New York, NY, USA.

Sengar, et al., "Robust Location Search from Text Queries", Proceedings of the 15th annual ACM international symposium on Advances in geographic information systems, Date: Nov. 7-9, 2007, 8 Pages, Publisher: ACM New York, NY, USA.

Bakshi, R. et al.; "Exploiting Online Sources to Accurately Geocode Addresses"; Proceedings of the $12^{th}$ Annual ACM International Workshop on Geographic Information Systems; Washington, DC; Nov. 12-13, 2004; pp. 194-203.

Cai, G.; "GeoVSM: An Integrated Retrieval Model for Geographical Information"; GIScience; 2002; LNCS 2478; pp. 67-79.

Cayo, M. et al.; "Positional error in automated geocoding of residential addresses"; International Journal of Health Geographics; 2003; pp. 1-12.

Chen, Y. et al.; "Efficient Query Processing in Geographic Web Search Engines"; Proceedings of the 2006 ACM SIGMOD International Conference on Management of Data; Chicago, IL; Jun. 27-29, 2006; pp. 277-288.

Dictionary.com; "Define Textual at Dictionary.com"; http://dictionary.Reference.com/browse/lexical and http://dictionary.reference.com/browse/textual; pp. 2; retrieved Mar. 5, 2010.

Jacox, et al.; "Spatial Join Techniques"; ACM Transactions on Database Systems, vol. V, No. N; Nov. 2006; pp. 1-45 and appendix pp. App-1 to App-23.

Jones, C. et al.; "GIR'05 2005 ACM Workshop on Geographical Information Retrieval"; Workshop Report; ACM SIGIR Forum; vol. 40, No. 1; Jun. 2006; pp. 34-37.

Jones, C. et al.; "The SPIRIT Spatial Search Engine: Architecture, Ontologies and Spatial Indexing"; Geographic Information Science; Third International Conference 2004; vol. 3234; Oct. 2004; pp. 1-16.

Joshi, T. et al.; "Crosslingual Location Search"; Proceedings of the $31^{st}$ Annual International ACM SIGIR Conference on Research and Development in Information Retrieval; 2008; ACM, New York, NY; pp. 211-218.

Kimler, M.; "Geo-Coding: Recognition of Geographical References in Unstructured Text, and Their Visualisation"; Diploma Thesis at the University of Applied Sciences Hof, Department of Computer Science and Technology, Technical Computer Science; Ispra; Italy; Aug. 23, 2004; 85 pages.

Krieger, N. et al.; "On the Wrong Side of the Tracts? Evaluating the Accuracy of Geocoding in Public Health Research"; American Journal of Public Health; vol. 91, No. 7; Jul. 2001; pp. 1114-1116.

Leidner, J.; "Toponym Resolution in Text: 'Which Sheffield is it?'"; Proceedings of the $27^{th}$ Annual International ACM SIGIR Conference on Research and Development in Information Retrieval; Sheffield, UK; 2004; pp. 602-605.

Leidner, J.; "Toponym Resolution in Text, Annotation, Evaluation and Applications of Spatial Grounding of Place Names"; Institute for Communicating and Collaborative Systems; School of Informatics, University of Edinburgh; 2007; 287 pages.

Martins, B. et al.; "Indexing and Ranking in Geo-IR Systems"; GIR'05; Nov. 4, 2005; Bremen, Germany; 4 pages.

Nicoara, G.; "Exploring the Geocoding Process: A Municipal Case Study using Crime Data"; Masters Thesis, The University of Texas at Dallas; Summer 2005; 29 pages.

Ratcliffe, J.; "On the accuracy of TIGER-type geocoded address data in relation to cadastral and census areal units"; International Journal of Geographical Information Science; vol. 15, No. 5; 2001; pp. 473-485.

Schlieder, C. et al.; "Qualitative Spatial Representation for Information Retrieval by Gazetteers"; Proceedings of Conference of Spatial Information Theory COSIT; vol. 2205; Morro Bay, CA; 2001; pp. 336-351.

"Trillium Software System"; http://www.trilliumsoftware.com/home/products/index.aspx; retrieved on Feb. 15, 2008.

Vestavik, O.; "Geographic Information Retrieval: An Overview"; 2003; 7 pages.

Watters, C. et al.; "GeoSearcher: Location Based Ranking of Search Engine Results"; J. Am. Soc. Inf. Sci. Technol.; vol. 54, No. 2; Jan. 2003, pp. 140-151.

WiseGeek.com; "What is Cache Memory"; http://www.wisegeek.com/what-is-cache-memory.htm Web Archive URL: http://web.archive.org/web/20061107115341/http://www.wisegeek.com/what-is-cache-memory.htm; Nov. 7, 2006; pp. 3.

Zhou, Y. et al.; "Hybrid Index Structures for Location-based Web Search"; Proceedings of the 14th ACM International Conference on Information and Knowledge Management; Bremen, Germany; 2005; pp. 155-162.

Zwol et al.; "Spatially-Aware Information Retrieval on the Internet"; Jul. 1, 2003; 15 pages.

Rhind, G.R. Global Sourcebook of Address Data Management A Guide to Address Formats and Data in 193 Countries. Gower Publishing Ltd, 2005; pp. 4-28.

* cited by examiner

CROSS LINGUAL LOCATION SEARCH

RELATED APPLICATION

This patent is related to the U.S. patent application Ser. No. 12/145,607 entitled, "FAST APPROXIMATE SPATIAL REPRESENTATIONS FOR INFORMAL RETRIEVAL," filed on the same day as this application.

BACKGROUND

Determining a geographic match, or geocoding, to a text search is a relatively well studied problem. There are numerous web-based and commercial mapping products used for route planning, fuel/cost estimation, and simple travel planning. Such products include Google Maps™, Yahoo Maps™, and Windows Live Local™. Each of these products uses the same language (such as English) in both the underlying database and the user interface. Attempts to geocode location queries in a language different from the underlying database, particularly when the language uses a different script or alphabet, have a very low success rate, if any. For example, queries in Hindi, Arabic, or Japanese made against an English language geo-database may have a very low success rate.

Geocoding also includes more than one type of query. One is a structured address, for example, 233 South Wacker Drive, Chicago, Ill., 60606, is well formed in a conventional U.S. address format, with no misspellings. These queries, in English, usually return accurate results. An unstructured query, such as Sears Tower, or the Loop, may also return accurate results for some well known landmarks or features.

However, several factors can greatly reduce the accuracy of results for geocoding queries. One factor is ill-formed queries, with either data missing or data in a non-standard sequence. Another factor is misspellings in the query. A third factor is queries in a language different from the underlying database, which may be even further complicated by queries in languages with alphabets or character sets different from the underlying geographic database.

Yet other factors that raise inaccuracy in results for geocoding queries include different address formats across national boundaries, extraneous terms (that don't match anything) or non-unique identifiers (for example, there are over 1000 "1st Cross" roads in Bangalore, India).

Geographic data, and particularly map data, are intrinsically tied to given regions, and hence are available predominantly in local languages. In addition, the business, resource and interoperability considerations often dictate that such data are created only for a small set of languages. Yet in today's increasingly globalized world, there is a clear need for accessing geographic information across languages. Examples range from Indian citizens who want to query in their own local languages, the land records traditionally created in English, through cross-lingual geographic indexing of documents, to visitors at the 2008 Olympics who will want to find Beijing locations using many languages other than Mandarin Chinese. Despite the clear motivation for crosslingual location searches, to the best of our knowledge, there are no academic or commercial systems that support general crosslingual location search.

A possible approach to crosslingual location search would be to create and represent all geographic entities in all languages, but this is financially and logistically unviable (for example, a country of the size of the US has several million unique streets, localities, landmarks, etc., and moreover, these are updated on a continual basis). Alternatively, one could use a machine translation/transliteration system to convert the query terms to the target language, and then process the results in a monolingual geocoder in the target language. However, the linguistic ambiguities inherent in the process, increase the search space exponentially, and degrade the accuracy of results greatly. In addition, the fact that descriptions of locations and addresses are structured differently in different regions—or may be unstructured altogether—makes cross lingual location search a particularly difficult challenge.

SUMMARY

A geocoding search uses a combination of translation, transliteration, and fast spatial lookup to prune a list of candidate locations when performing a location search. The technique works for both ill-formed or misspelled queries as well as queries in languages different from the language of the underlying geographic database. Addition of new languages or alphabets requires only straightforward training.

A demonstration system using this technique provides accurate results for both structured and unstructured queries in English, Hindi, Arabic, and Japanese.

The technique parses a query into tokens (groups of text) and performs a transliteration of proper names, as well as a translation and transliteration of common nouns. This process may result in a substantial number of combinations of translations and transliterations for each token. Each token is then keyed to a spatial database. The spatial matches are compared for overlaps, or constraints and tokens having a spatial relationship are selected for analysis using actual geometric data.

The spatial database is not simply a list of locations, but includes a union of geometric boundaries for every a geometry (bounded location) having a common location. For example, a spatial database entry for "London" may include geometries for London, England; London Connecticut; and London Bridge in Arizona.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
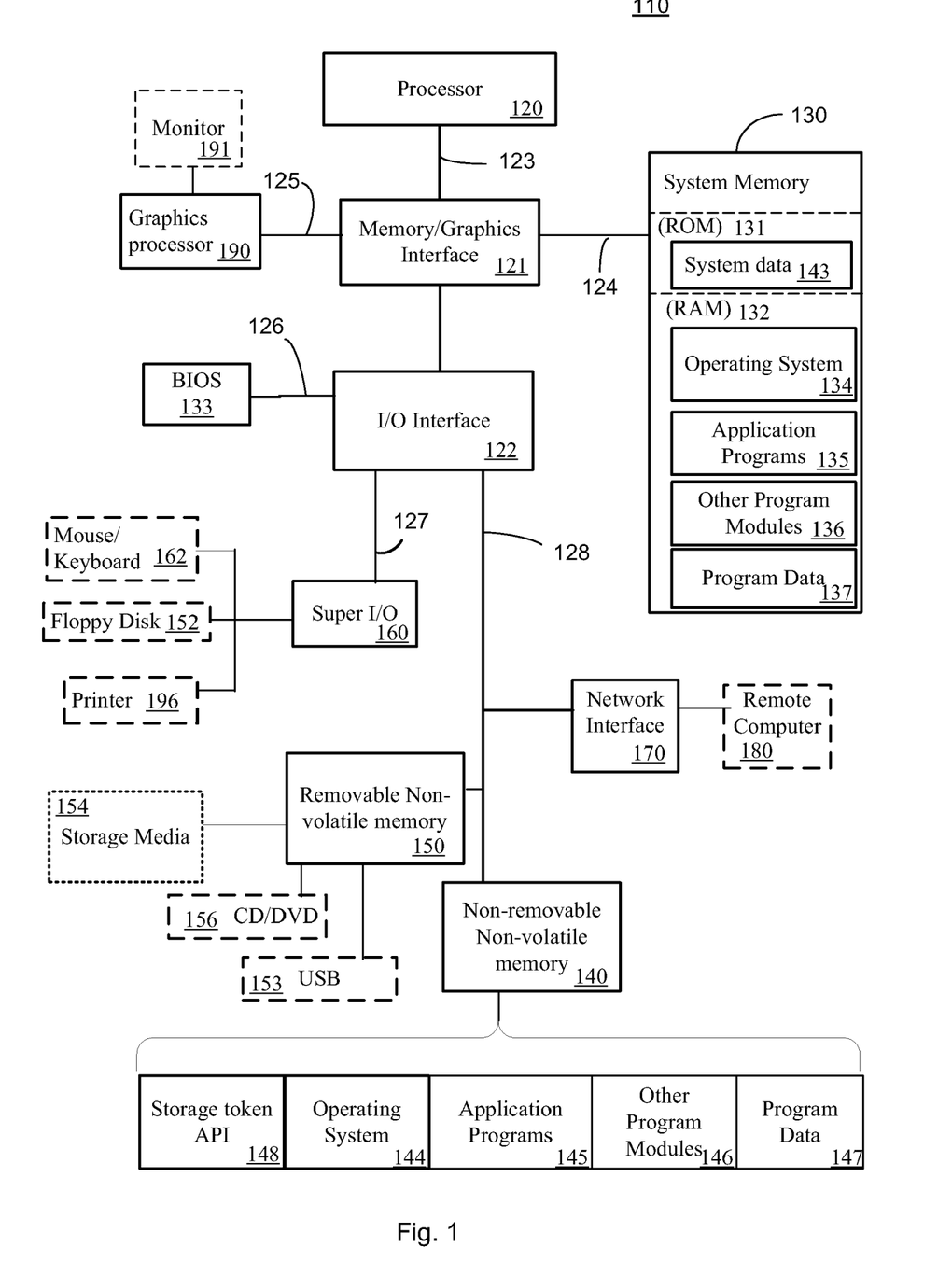
FIG. 1 is a block diagram of a general purpose computing device in communication suitable for use in cross-lingual location searches.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive or may be similar to the storage media described below with respect to FIG. 2.

Removable media, such as a universal serial bus (USB) memory 153, firewire (IEEE 1394), or CD/DVD drive 156 may be connected to the PCI bus 128 directly or through an interface 150. A storage media 154 similar to that described below with respect to FIG. 2 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 2:
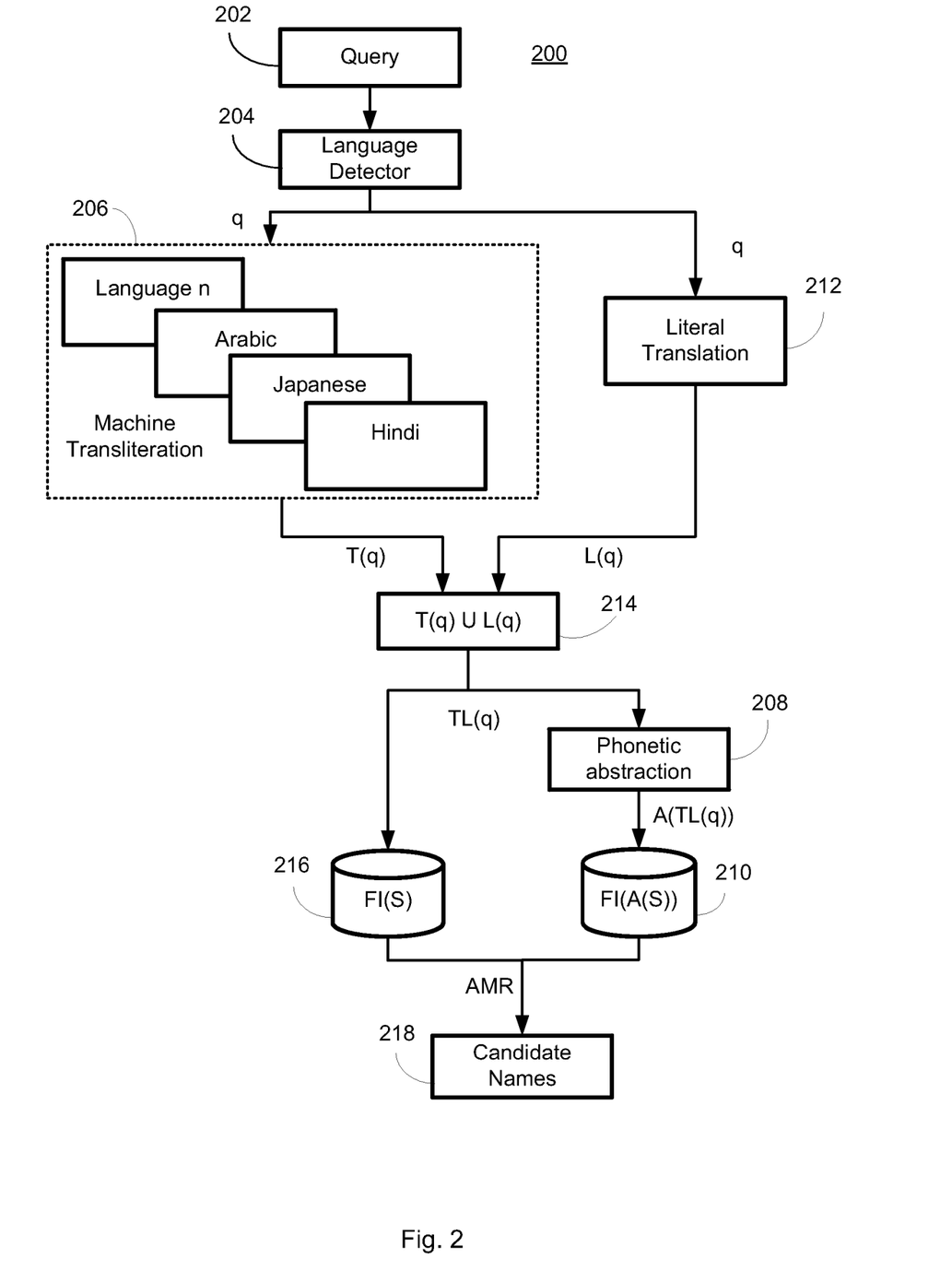
FIG. 2 is a flow chart of a method of selecting cross-lingual terms for a location search.

FIG. 2 illustrates a processing flow 200 for developing candidate names for geographic or other n-dimensional searches.

The bulk (not all) of words in geographic entity names are proper nouns, and in general cannot be translated readily like other parts of speech (such as, common nouns, adjectives, verbs, etc.) that are a part of standard bilingual dictionaries. Where source and target language share the same script, the problem is not readily apparent as the proper nouns are generally identical (for example, "Berlin" is correct in German, English, and Italian, though some variations in orthography and pronunciation exist, such as, "Antwerp" is "Antwerpen" in Dutch, "London" is "Londres" in Spanish, etc.). For different scripts, a name in the source language needs to be transliterated, that is, converted into a string in the target script which preserves the original pronunciation of the source word, yet conforming to the pronunciation rules of the target language.

Since the mapping between pronunciation and spelling is not fully deterministic in both languages, transliteration is an inherently ambiguous process. For example, the transliterations of "رملب" (representing "Palmer") could be "Palmer", "Bilmar" etc. [1], as Arabic does not distinguish between "b" and "p" and short vowels may not be represented in Arabic orthography. Similarly, the English transliterations of Hindi syllable "की" could be highly ambiguous, as many English phonetic constructs, such as, "key", "kee", "ki" and "kea" are possible. As a consequence, for each source word, several transliteration candidates have to be considered to achieve a reasonable confidence that the correct transliteration is included. This leads to a large number of possible interpretations of a multiword query, as illustrated in Table 1, which shows some machine transliteration results for the Arabic address fragment "رملب دور ديربدير جدنن", which should be transliterated as "Palmer Road Redbridge London".

TABLE 1

Transliteration ambiguity example

| ÈáäÑ | Næl | NíÌÈNíìÌ | áäÌä |
|---|---|---|---|
| blemer | rod | redbridge | landon |
| plemer | rud | redpridge | lendon |
| belmer | rood | ridbridge | lindon |
| balmer | rhod | ridpridgered | landen |
| blimer | road | predge | lenden |
| ... | ... | ... | ... |

Another source of ambiguity is that queries can contain common nouns, which can both be translated and transliterated. For example, depending on context, either the transliteration "al-matar" or the translation "airport" may be preferable for the word "المطار" in an Arabic language query. Consider the impact of having to consider many alternatives to each word in the query, especially in the absence of tokens such as commas to delimit one potential term from another. If k transliterations/translations need to be considered for each word in an n word query, which can be partitioned into subsequences in $2^{n-1}$ ways, then the total number of possible combinations of non-overlapping subsequences to be considered is $k^n 2^{n-1}$, which, even for the short (four word) Arabic query above, with k=5, amounts to 5000 combinations.

The crosslingual challenges discussed above compound with existing monolingual challenges. The ambiguity in spellings, names and orderings inherent in crosslingual matching make simple composition of translation/transliteration with monolingual location search an unviable option.

To address these issues, in response to a query at block 202, a language detector may be activated at block 204. The language detector may parse the query into individual tokens, as required, and then determine a source language for each token. In some cases, the query may be in mixed languages, in which case, the language detector may identify individual tokens for processing in separate languages. An individual token or tokens 'q' may be directed to blocks 206 and 212.

At block 206, a language-specific machine transliteration tool may be used to process the query tokens. The output of block 206 may be a list of machine transliterated query tokens T(q). The machine transliterated tokens may be provided to block 214. In one embodiment, the addition of new languages requires only a change to this block and the language detector at block 204, the other blocks being language independent. One embodiment of the machine transliteration system uses a Viterbi training alignment and a Maximum Entropy classifier to generate target language transliteration candidates for a source language word. An alignment algorithm may be used to align each single character of a source word with zero or more characters in the target language transliteration. Because the classifier takes the strictly monotonic nature of alignments in transliteration into consideration, it is better suited for the task than general machine translation alignment tools. Based on the resulting alignments, a maximum entropy classifier may be trained to estimate the probability that source language character, in the context of the 3 preceding and the 3 following source characters, should be transliterated to a given target language string.

Returning to block 212, the token or tokens 'q' may be translated via a lookup table of common nouns, such as "airport." The output of block 212 may be one or more tokens L(q).

At block 214, a cross product of the most promising text subsequences may be generated. This set of transformed subsequences may be ranked by probabilistic estimates provided by block 206. The output of block 214, TL(q), a union of the transliterated results of block 206 and the translation results of block 212 may be passed to blocks 208 and 216.

At block 216, the TL(q) terms may be matched in a fuzzy search of geographic entities. A previously prepared database FI(S) of geometric footprints and their associated attributes (e.g. names) may be used for comparison with the token or tokens TL(q). Because this first-phase screen is used to rank tokens by confidence of correct identification, the geometric footprint may include all spatial regions with a common attribute. For example, geometries for all spatial regions named London (London, UK; London, Connecticut; London, Ohio; etc.) may be grouped, whether or not a geographic overlap or constraint exists. That is, the database may have records with a common name, e.g. "London", and one or more spatial representations of all cataloged locations having that common name.

At block 208, each machine translated token T(q) may be abstracted into a phonetic representation of the query token, that is, with no further language-specific connotations. The phonetic abstraction may be performed after the fashion of the known SOUNDEX algorithm, that attempts to capture the phonetic essence of the token. In one embodiment, a rule-based abstraction engine may be used, but other phonetic abstraction algorithms may also be used. The output of block 208, the abstracted version of TL(q), A(TL(q)), may be provided to block 210.

At block 210, A(TL(q)) may be compared with a second database FI(A(S)). The second database, FI(A(S)), is essentially the same as database FI(S), with the exception that the attribute (e.g. name) data is also abstracted using the phonetic abstraction process used at block 208. That is, the database FI(A(S)) may have a records with a common name, e.g. "London", one or more phonetic names, and one or more spatial representations of all cataloged locations having that common name. This allows matching the abstracted query term to be fuzzy matched with an abstracted name of a geographic spatial region. The output of block 210, referred to as an Approximate Match Record, may be combined with the Approximate Match Record output of block 216 and sent to block 218.

At block 218, the resulting list of AMRs contributed by both blocks 210 and 216 may be ordered using one or more measures of textual affinity, including machine translation probabilities and edit distance scores returned by the fuzzy lookups performed in blocks 210 and 216. In one embodiment, the measures applied to the abstracted lookup AMRs from block 216 may be weighted slightly lower than the other AMRs. The output of block 218 may be a list of candidate matches that have some measure of spatial affinity with the original query token or tokens. For example, the common name or names associated with the overlapping spatial region or regions may be selected and these candidate matches may then be passed to a more definitive geographic matching tool. The latter tool may provide a more concise list of possible matches back to a requesting entity, such as a user or geographic information system (GIS).

The actual process of computing and representing the geographic footprints of query tokens is discussed in more detail in co-pending application "FAST APPROXIMATE SPATIAL REPRESENTATIONS FOR INFORMAL RETRIEVAL," filed on the same day as this application with Ser. No. 12/145,607.

The use of the Approximate Match Records to complete a geo-reference search is discussed in co-pending U.S. patent application Ser. No. 11/831,939, filed Jul. 31, 2007, with the title, "Generalized Location Identification," which is hereby incorporated by reference.

Figure 3:
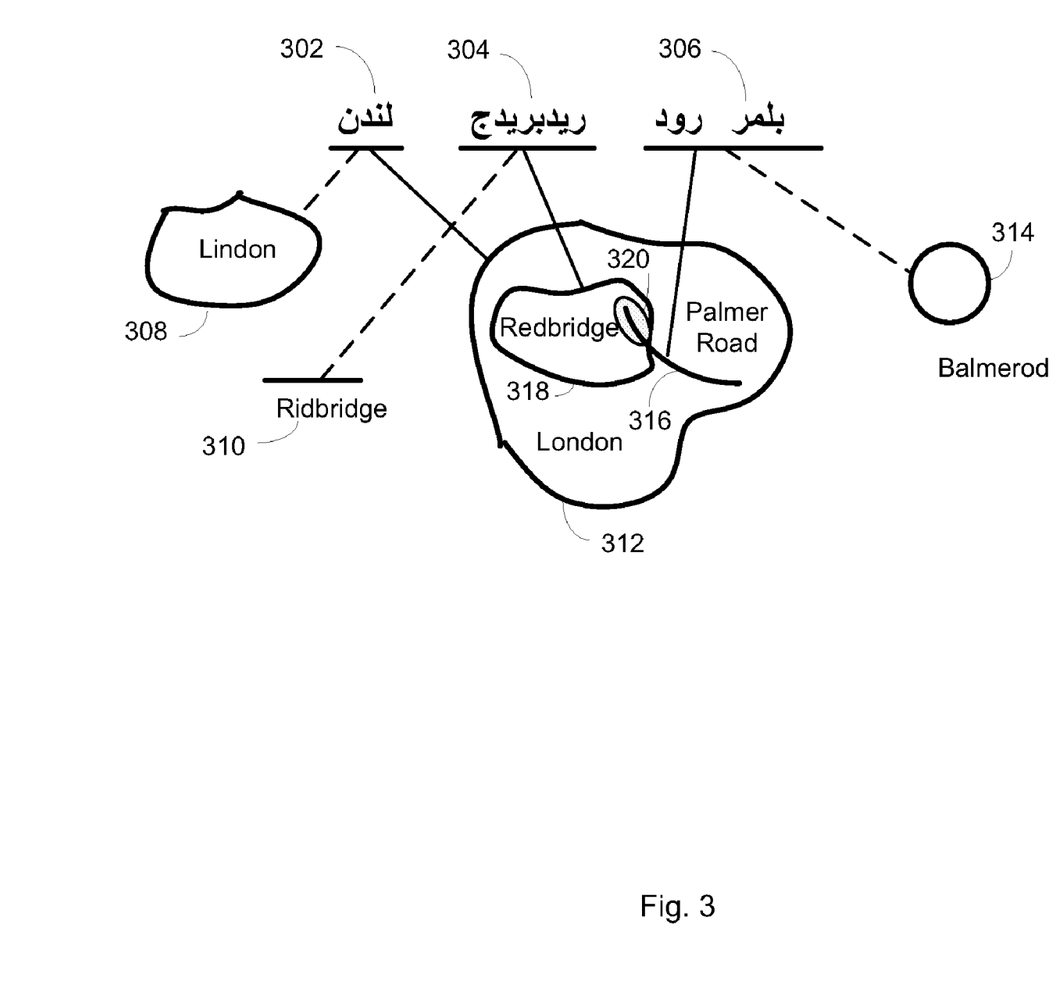
FIG. 3 illustrates a cross-lingual location search.

Referring to FIG. 3, the use of spatial constraints to resolve ambiguities in abstracted search tokens is discussed. In the above example, there were many possible interpretations for the English candidate transliterations of the Arabic location query. For the sake of illustration, two abstracted tokens for each query token are illustrated. Query token 302, may provide a transliterated, abstracted, fuzzy-matched result of Lindon 308 and London 312. Query token 304 may provide a transliterated, abstracted, fuzzy-matched result of Ridbridge 310 and Redbridge 318. Query token 306 may provide a transliterated, abstracted, fuzzy-matched result of Palmer Road 316 and Balmerod 314.

However, of these, only the sets of entities that spatially overlap, London 312, Redbridge 318 and Palmer Road 316 are plausible candidates. Thus, the fact that three particular entities named "Palmer Road", "Redbridge", and "London" (in the U.K.) all spatially overlap, gives a powerful reason to pick this interpretation from all possible interpretations of the query. Moreover, the region of overlap 320 (the gray region in the figure) of these three entities defines the geometric scope of the result.

The use of a combination of translation, transliteration, and fuzzy phonetic lookup provides tokens useful for presentation to a geographic spatial matching tool. The binary tree classification for geographic regions and extremely fast matching process afforded by such a classification system (as described in the co-pending application referenced above) allows practical, timely, cross-lingual searches for map locations and points of interest. As discussed above, the sheer number of possible combinations of translation or transliteration make current techniques impractical or impossible for widespread use. As disclosed above, the ability to perform searches in one language on a geographic database in another language opens a number of mapping applications to a worldwide audience for which such tools were not practically available. Similarly, providers of geographic data can open new markets for GIS applications, paid search, and sponsored searches without tedious and expensive translation of massive geographic databases.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method comprising:

receiving a geocoding query, the geocoding query comprising query tokens in a source language written in a source language script;

parsing the geocoding query into the query tokens;

transliterating the query tokens to provide transliterated query tokens in a target language written in a target language script, wherein the target language is different than the source language, the target language script is different than the source language script, and the transliterated query tokens include multiple different location names that are different interpretations of a location name provided by a first one of the query tokens;

determining approximate matches between the transliterated query tokens and database name entries, the database name entries having corresponding geometric footprints that comprise one or more spatial regions; and selecting candidate matches from the approximate matches based on spatial affinity of the approximate matches, wherein the spatial affinity reflects overlap of the corresponding geometric footprints of the database name entries and wherein the candidate matches include an individual location name from the multiple different location names;

wherein at least the selecting the candidate matches is performed by a computing device, wherein the candidate matches are in the target language and are written in the target language script.

2. The method of claim 1, further comprising:

translating an individual query token that is a common noun; and comparing the translated individual query token that is the common noun to the database name entries.

3. The method of claim 1, wherein multiple candidate matches are selected.

4. The method of claim 1, wherein the multiple different location names include multiple phonetic abstractions of the first query token.

5. A computer-readable memory device or storage device having computer-executable instructions that, when executed by a processor, cause the processor to perform the method of claim 1.

6. A computer-readable memory device or storage device having computer-executable instructions that, when executed by a computing device, cause the computing device to perform acts comprising:

receiving a query comprising a plurality of query tokens in a first language;

performing machine transliteration of the query tokens in the first language to provide machine transliterated query tokens in a second language that is written in a different script than the first language;

comparing the machine transliterated query tokens in the second language to name attributes of a spatial database, wherein the name attributes are also in the second language and identify spatial regions having corresponding geometric footprints;

based on the comparing, identifying matching name attributes that approximately match the machine transliterated query tokens;

identifying candidate matches for the query from individual matching name attributes for which the corresponding geometric footprints have geometric overlap;

abstracting individual query tokens to obtain abstracted query tokens;

comparing the abstracted query tokens to abstracted name attributes of an abstracted spatial database, wherein the abstracted name attributes identify other spatial regions having other corresponding geometric footprints; and identifying further candidate matches for the query from individual abstracted name attributes that approximately match the abstracted query tokens and for which the other corresponding geometric footprints have geometric overlap.

7. The computer-readable memory device or storage device of claim 6, the acts further comprising:

excluding, from the candidate matches, at least some matching name attributes for which the corresponding footprints do not geometrically overlap.

8. The computer-readable memory device or storage device of claim 6, the acts further comprising:

parsing the query to obtain individual query tokens for the machine transliteration.

9. The computer-readable memory device or storage device of claim 6, the acts further comprising:

before the abstracting, performing machine translation on the individual query tokens to obtain machine translated query tokens, wherein the abstracting is performed on one or more of the machine translated query tokens to obtain the abstracted query tokens.

10. The computer-readable memory device or storage device of claim 6, wherein the abstracting is performed on one or more of the machine transliterated query tokens to obtain the abstracted query tokens.

11. The computer-readable memory device or storage device of claim 6, wherein the abstracted query tokens are phonetic abstractions of the query tokens and the abstracted name attributes are phonetic abstractions of the name attributes.

12. A system comprising the computer-readable memory device or storage device of claim 6 and the computing device.

13. A system comprising:

one or more computer-readable memory devices or storage devices comprising instructions configured to:

receive a geocoding query, the geocoding query comprising query tokens in a source language written in a source language script, transliterate the query tokens to provide transliterated query tokens in a target language written in a target language script, wherein the target language is different than the source language, the target language script is different than the source language script, and the transliterated query tokens include multiple different location names that are different interpretations of a location name provided by a first one of the query tokens, determine approximate matches between the transliterated query tokens and database name entries, the database name entries having corresponding geometric footprints that comprise one or more spatial regions, and select one or more candidate matches from the approximate matches based on spatial affinity of the approximate matches, wherein the spatial affinity reflects overlap of the corresponding geometric footprints of the database name entries and wherein the candidate matches include an individual location name from the multiple different location names; and a processor configured to execute the instructions,
wherein the one or more candidate matches are in the target language and are written in the target language script.

14. The system of claim 13, wherein the instructions are further configured to obtain the multiple different location names by performing a phonetic abstraction process on the first query token to obtain phonetic abstractions of the first query token.

15. The system of claim 14, wherein the phonetic abstraction process is applied after the first query token has been transliterated.

16. The system of claim 15, wherein the database name entries include phonetic names for at least some of the multiple different location names.

17. The system of claim 16, wherein the instructions are further configured to determine the approximate matches by comparing the phonetic abstractions of the first query token to the phonetic names included in the database name entries.

18. The system of claim 17, wherein the database name entries also include a common name in the target language for the individual location name.

19. The system of claim 13, wherein the source language is Arabic and the target language is English.

20. The system of claim 13, wherein each of the candidate matches includes at least one of the multiple different location names.

* * * * *